US010109972B2

(12) United States Patent
Backenstoes et al.

(10) Patent No.: US 10,109,972 B2
(45) Date of Patent: Oct. 23, 2018

(54) TERMINAL CRIMPING DEVICE

(71) Applicant: TYCO ELECTRONICS CORPORATION, Berwyn, PA (US)

(72) Inventors: Thomas Emery Backenstoes, Harrisburg, PA (US); Mark Andrew Ondo, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 169 days.

(21) Appl. No.: 14/813,825

(22) Filed: Jul. 30, 2015

(65) Prior Publication Data

US 2017/0033525 A1 Feb. 2, 2017

(51) Int. Cl.

*B23P 19/00* (2006.01)
*H01R 43/20* (2006.01)
*H01R 43/055* (2006.01)

(52) U.S. Cl.

CPC ...... *H01R 43/055* (2013.01); *Y10T 29/53209* (2015.01)

(58) Field of Classification Search

CPC ........... Y10T 29/53235; Y10T 29/5193; Y10T 29/53213; Y10T 29/49185; Y10T 29/53226; Y10T 29/49174; Y10T 29/5142; Y10T 29/49181; Y10T 29/53209; Y10T 29/53513; H01R 43/04; H01R 43/048; H01R 43/0421

USPC ......... 29/747, 742, 748, 751, 752, 753, 755, 29/760, 861, 863, 33 M; 72/409.06, 72/409.14, 413, 420, 446, 470, 482.8, 712

See application file for complete search history.

(56) References Cited

U.S. PATENT DOCUMENTS 2,534,867 A * 12/1950 Hennessey ............. H01R 43/04 29/417
8,578,597 B2 * 11/2013 Dobson, Jr. .......... H01R 43/055 29/33 M

OTHER PUBLICATIONS

Inarca,Inar-Splice Mat Application for Magnet Wire Connection M.2.06, http://inarca.com/pdf/pdf2013/M-2.6.pdf.
Autosplice, Spliceband® Technology, http://autosplice.com/spliceband%C2%AE-technology.html.

* cited by examiner

*Primary Examiner* — Thiem Phan

(57) ABSTRACT

A terminal crimping device that crimps a terminal to a component includes a terminal feeder feeding one or more pre-formed terminals on a generally horizontal feed plane and a ram moving a drive crimper along a generally vertical crimp stroke. The drive crimper engages the pre-formed terminal at the feed plane and transfers the terminal to a crimp zone below the feed plane and remote from the terminal strip to crimp the terminal to the component.

20 Claims, 4 Drawing Sheets

TERMINAL CRIMPING DEVICE

BACKGROUND OF THE INVENTION

The subject matter herein relates generally to terminal crimping devices for crimping electrical terminals to other components, such as wires.

Terminal crimping machines have long been used in the connector industry to effect high-speed mass termination of various terminals to wires. It is common practice for the terminal crimping machine to have an interchangeable tooling assembly called an applicator. The terminal crimping machine includes a movable tool that is moved towards a base component in a crimp zone during a crimping stroke to crimp a terminal to the wire. Some terminal crimping machines have terminal feeders used to feed a terminal strip, having plural terminals interconnected with each other and/or a carrier strip, directly into the crimp zone.

Known terminal crimping machines are not without disadvantages. For instance, the frame and housing of the components used to press the movable component occupy a large amount of space around the crimp zone. Additionally, the feeder assembly is mounted to the frame near the crimp zone. Some terminal crimping machines also include a wire feeder mounted to the frame near the crimp zone for feeding the wire to the crimp zone. Thus, there is a limited amount of unoccupied space around the crimp zone. Some systems may require crimping to the wire when the wire is included in a workpiece. For example, the wire may be a magnet wire mounted on a motor, such as an electronically commutated motor, where the wires defining the windings are tightly wound around a cap and parallel windings need to be electrically connected, such as by splicing wires of adjacent windings. There is insufficient space around the crimp zone for positioning the workpiece and the associated wire for crimping the terminal thereto.

A need remains for terminal crimping machine that provides adequate space around the crimp zone for receiving wires, such as wires that are integrated with workpieces.

BRIEF DESCRIPTION OF THE INVENTION

In one embodiment, a terminal crimping device is provided that crimps a terminal to a component. The terminal crimping device includes a terminal feeder feeding one or more pre-formed terminals on a generally horizontal feed plane and a ram moving a drive crimper along a generally vertical crimp stroke. The drive crimper engages the pre-formed terminal at the feed plane and transfers the terminal to a crimp zone below the feed plane and remote from the terminal strip to crimp the terminal to the component.

In another embodiment, a terminal crimping device is provided that crimps a terminal to a component. The terminal crimping device includes a terminal feeder having a feed track holding a pre-formed terminal. The terminal feeder feeds the terminals along a feed axis on a feed plane. A base crimper is held in a fixed crimping position relative to the component in a crimp zone remote from the feed plane. The base crimper has crimp tooling configured to crimp the terminal to the component. The terminal crimping device includes a ram moving along a crimp stroke axis towards and away from the base crimper. The ram has a drive crimper configured to engage the pre-formed terminal and transfer the terminal out of the feed plane to the crimp zone. The drive crimper cooperates with the crimp tooling of the base crimper to deform the terminal and crimp the terminal to the component.

In another embodiment, a terminal crimping device is provided that crimps a terminal to a component. The terminal crimping device includes a frame, a terminal feeder mounted to the frame, a base crimper mounted to the frame, a press mounted to the frame, and a workpiece support mounted to the frame. The terminal feeder has a feed track feeding plural terminals that are pre-formed and attached as a terminal strip along a feed axis on a feed plane to a shear zone. The base crimper is held in a fixed crimping position relative to the component in a crimp zone remote from the shear zone. The base crimper has crimp tooling configured to crimp the terminal to the component. The press holds a ram and moves along a crimp stroke between the shear zone and the crimp zone. The ram has a drive crimper shearing the pre-formed terminal from the terminal strip in the shear zone and transferring the sheared, pre-formed terminal out of the shear zone to the crimp zone. The drive crimper cooperates with the crimp tooling of the base crimper to deform the terminal and crimp the terminal to the component in the crimp zone. The workpiece support holds a workpiece adjacent the crimp zone and remote from the terminal feeder. The workpiece has the component. The workpiece support holds the workpiece such that the component is held relative to the base crimper for termination to the terminal.

DETAILED DESCRIPTION OF THE INVENTION

Figure 1:
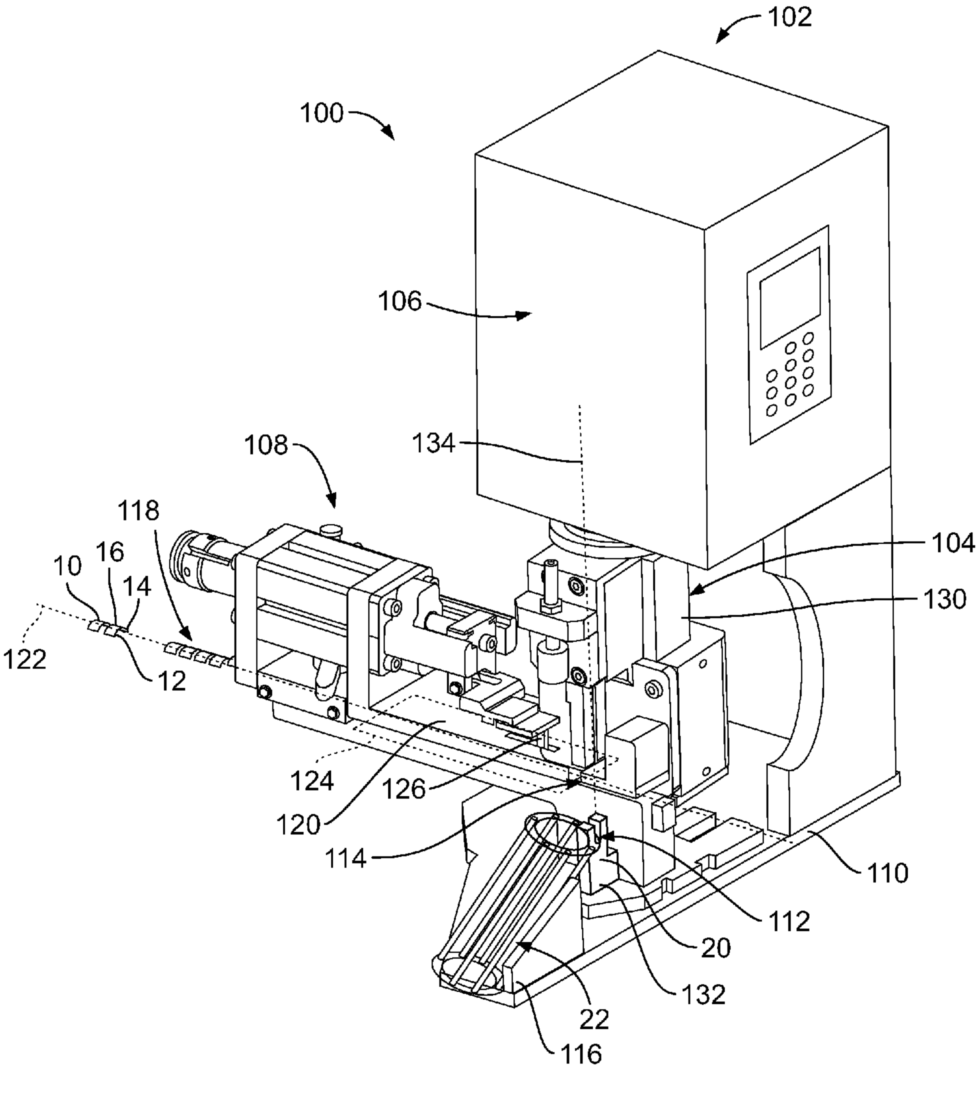
FIG. 1 is a front perspective view of a crimping system including a terminal crimping device formed in accordance with an exemplary embodiment.

FIG. 1 is a front perspective view of a crimping system 100 including a terminal crimping device 102 for crimping a terminal 10 to a component 20. In the illustrated embodiment, the terminal crimping device 102 is used to crimp the terminal 10 to a wire, identified hereinafter as wire 20; however the terminal 10 may be crimped to other components in alternative embodiments. Optionally, the terminal 10 may be used to splice two wires 20 together. In other various embodiments, the terminal 10 may be terminated to an end of a wire 20 and used for connection to another component or device.

In the illustrated embodiment, the wire 20 is part of a workpiece 22. For example, the workpiece 22 may be a motor and the wire 20 may be a magnet wire used as a coil winding of the motor. The wire 20 may be held in place on the workpiece 22 and the terminal 10 may be crimped to the wire 20 in place on the workpiece 22. For example, the wires 20 may define windings of the motor that are tightly wound around a cap or other structure of the motor and parallel windings are electrically connected by splicing wires of adjacent windings using the terminal 10. The terminal crimping device 102 accommodates positioning of the workpiece 22 at or adjacent to a crimp zone 112. For example, clearance may be provided around the crimp zone 112 to allow termination of the terminal 10. The crimp zone 112 may be remote from the feed location of the terminals 10 because feeders occupy a considerable amount of space. The terminal crimping device 102 is used to transfer the terminal 10 from the feed area to the crimp zone 112 to allow crimping remote from the feed area and the components used for feeding. By moving the terminal 10 to the crimp zone 112, more space is provided around the crimp zone 112 for positioning the workpiece 22.

The terminal crimping device 102 may be a terminator or press that actuates or controls the crimping operation, such as by providing the motive force for the crimping process or operation. Optionally, the terminal crimping device 102 may be part of a larger terminal crimping machine, such as a leadmaker used for making electrical leads. The terminal crimping device 102 may transfer the terminal 10 to an area for termination to the end(s) of the leads to simplify other components of the machine, such as the wire feed components. For example, by transferring the terminal 10 to the lead, rather than transferring the lead to the terminal 10, the wire feed components may be less complex. The wires or leads may be fed through the system more efficiently, speeding up leadmaking time.

In the illustrated embodiment, the terminal crimping device 102 includes an applicator 104 having a press 106 effecting the crimping operation and forming the terminal 10 around the wire 20 during each crimping operation. The terminal crimping device 102 includes a terminal feeder 108. The applicator 104 and terminal feeder 108 are mounted to or supported by a frame 110 of the terminal crimping device 102. For example, the applicator 104 is mounted to the frame 110 and defines the crimp zone 112 where the terminal 10 is crimped to the wire 20. The terminal feeder 108 feeds the terminals 10 to a feed area or shear zone 114, which is remote from the crimp zone 112. The applicator 104 is able to shear and transfer the terminal 10 from the shear zone 114 to the crimp zone 112.

In an exemplary embodiment, a workpiece support 116 is mounted to the frame 110, such as at or near the crimp zone 112. The workpiece support 116 supports the workpiece 22 to allow the terminal 10 to be crimped to the wire 20. For example, the wire 20 is mounted to or extends from the workpiece 22 and the workpiece 22 is held on the workpiece support 116 such that the wire 20 is properly positioned in the crimp zone 112 for receiving the terminal 10. Optionally, the workpiece 22 may support multiple wires 20 and the workpiece 22 may be positionable (e.g., rotated to different positions) to allow terminals 20 to be terminated to multiple wires 20. Optionally, the workpiece 22 may be arranged such that two or more wires 20 are positioned in the crimp zone 112 at a time and the terminal 10 may be crimped to the two or more wires 20 to splice the wires 20 together. In other various embodiments, rather than crimping terminals to wires on workpieces, the terminals 10 may be crimped to ends of wires and such wires may be fed to the crimp zone 112 by a wire feeder (not shown), which may be mounted to the frame 110 and positioned in a similar location as the workpiece support 116. The wires 20 may be positioned manually, such as by an operator, into the crimp zone 112.

Optionally, the components, such as the applicator 104, terminal feeder 108 and/or workpiece support 116, may be removed and replaced with different components, such as when a different size/type of terminal 10 is used, when a different size/type of wire 20 is to be terminated when a different size/type of workpiece 22 is used, when the components are worn or damaged, or when components having a different configuration is desired.

The terminal feeder 108 is coupled to the applicator 104 and is used to feed the terminals 10 to the shear zone 114. The terminal feeder 108 may be an electrically actuated feeder, a pneumatic feeder, a cam and linkage feeder, or the like, depending on the type of terminal crimping device 102. In an exemplary embodiment, the terminals 10 are sequentially coupled together, such as end-to-end or side-to-side, forming a terminal strip 118. Optionally, the terminals 10 are supplied on a reel (not shown) and fed from the reel by the terminal feeder 108.

In an exemplary embodiment, the terminals 10 are pre-formed (e.g., formed into a predetermined, non-flat shape, such as by a stamping and forming process, at a manufacturing station or machine separate from the terminal crimping device 102) and loaded on the reel. The terminals 10 may have any pre-formed shape for the particular application. For example, the terminals 10 may have a general U-shape or arch-shape. Optionally, only a portion of the terminal 10 may have the arch-shape, such as the portion of the terminal 10 being crimped (e.g., the crimp barrel), while another portion may have another shape, such as defining a mating pin or other type of electrical contact. In the illustrated embodiment, the terminals 10 have opposing legs 12, 14 joined at a corresponding base 16. The terminal 10 has a height measured from the base to the distal ends of the legs 12, 14. Optionally, the terminals 10 may be oriented such that the base 16 defines a top; however other orientations are possible, such as with the base 16 at a bottom, at a side, or elsewhere. The terminal 10 is electrically conductive and is at least partially formed of a conductive material, such as copper, aluminum, silver, or other metals.

The terminal feeder 108 includes a feeder arm 126 that engages the terminal strip 118 to advance the terminal strip 118 towards the shear zone 114, where the terminals 10 are individually sheared and separated from the terminal strip 118 during the crimping operation. In an exemplary embodiment, the terminal feeder 108 includes a feed track 120 that supports and guides the terminal strip 118. The terminals 10 are guided by the feed track 120 along a feed axis 122 to the shear zone 114. In an exemplary embodiment, the feed track 120 is oriented horizontally and feeds the terminals 10 along a horizontal feed plane 124 (defined along the bottoms of the terminals 10). The feed plane 124 may be defined by the feed track 120 or the base plate the feed track 120 and terminal strip 118 rest on. Other orientations are possible in alternative embodiments.

The sheared terminals 10 are transferred from the shear zone 114 to the crimp zone 112 where the terminals 10 are crimped to the wire(s) 20. Because the terminal feeder 108 occupies a predetermined space and the workpiece 22 occupies a predetermined space, the crimp zone 112 is remote from the shear zone 114. This allows the workpiece 22 to be positioned adjacent the crimp zone 112 so the wire 20 can be held in the crimp zone 112 on the workpiece 22 and the workpiece 22, being remote from the shear zone 114, does not interfere with the operation of the terminal feeder 108. Optionally, the sheared terminals 10 may be transferred a distance at least two times the height of the terminals 10 (e.g., measured from the base 16 to the distal ends of the legs 12, 14). In some various embodiments, the sheared terminals 10 may be transferred a distance at least five times the height of the terminals 10 to clear the feed zone and other components and move the pre-formed, sheared terminal 10 to the crimp zone 112.

The applicator 104 of the terminal crimping device 102 includes a ram 130 driven by the press 106 toward and away from a base crimper 132. The base crimper 132 is configured to be held in a fixed crimping position relative to the wire 20 in the crimp zone 112. For example, the base crimper 132 may be fixedly mounted to the frame 110. Alternatively, the base crimper 132 may be movable relative to the frame 110, such as rotatable or actuatable to move into and out of the crimp zone 112, but is held in a fixed position during crimping. For example, the base crimper 132 may be movable into and out of position relative to the wire 20 and/or the workpiece 22, then fixed in position so the ram 130 can operate and crimp the terminal 10 around the wire 20.

Figure 2:
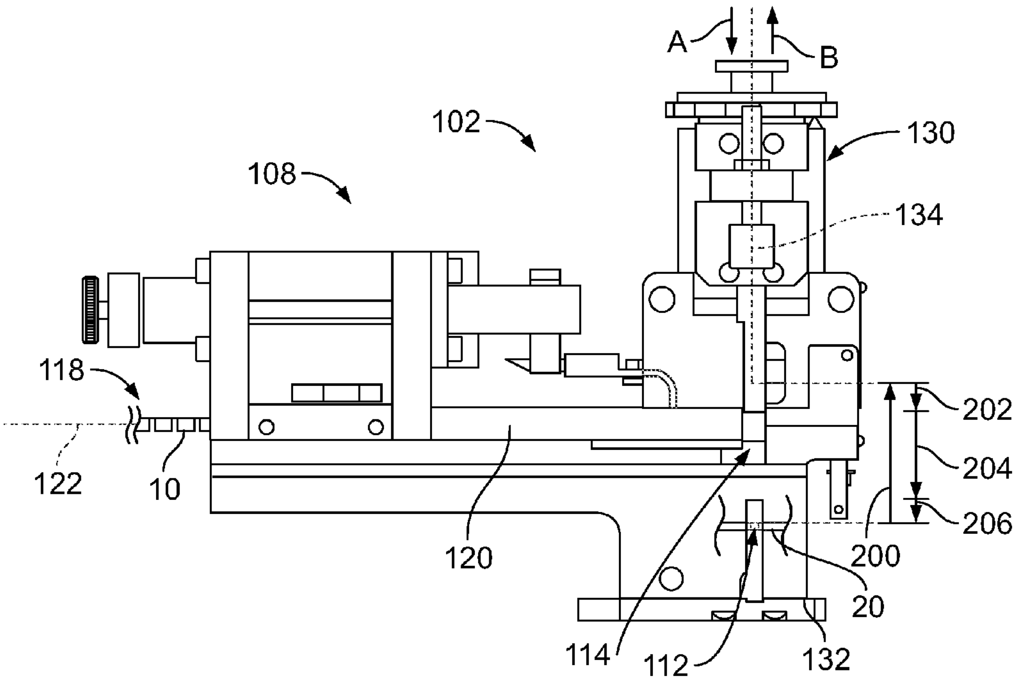
FIG. 2 shows a portion of the terminal crimping device shown in FIG. 1.

With additional reference to FIG. 2, which shows a portion of the terminal crimping device 102, operation of the terminal crimping device 102 is performed to shear and transfer the terminals 10 to the crimp zone 112 for crimping to the wire 10. During a crimping operation, the ram 130 is actuated or driven through a crimp stroke (e.g., cyclically driven upwards and downwards between a top position and a bottom dead center position) by a driving mechanism or actuator of the press 106, which may be driven by a motor (not shown). For example, the press 106 may include a motor having a crank shaft that moves the actuator vertically upward and downward, which causes the ram 130 to likewise move up and down. Alternatively, the actuator may be a linear actuator, a piezoelectric actuator, a pneumatic actuator, or the like. The ram 130 is moved along a ram axis 134, which may be oriented vertically. The ram axis 134 may be oriented perpendicular to the feed axis 122. The ram 130 is moved in an advancing direction (e.g., downward) and a retracting direction (e.g., upward) relative to the base crimper 132 during the crimp stroke.

During the crimping operation, the base crimper 132 receives the wire 20 in the crimp zone 112 and the ram 130 is cycled and advanced to shear the terminal 10 from the terminal strip 118 and transfer the sheared terminal 10 to the base crimper 132. The terminal 10 is crimped to the wire 20 by the base crimper 132 and the ram 130. For example, with reference back to FIG. 1, the base crimper 132 includes crimp tooling 136 that deforms the terminal 10 around the wire 20. The crimp tooling 136 is defined by crimp profile edges of the base crimper 132. The crimp tooling 136 causes the terminal 10 to wrap around the wire 20 and compresses the legs 12, 14 of the terminal 10 into the wire 20. The crimp profile edge may have any shape to form different shape crimps. For example, the crimp profile edge may be U-shaped, W-shaped or have another shape. The drive crimper 142 presses against the base 16 of the terminal 10 and forces the terminal 10 into the base crimper 132 during the crimping operation. The crimp tooling 136 is configured to mechanically crimp the terminal 10 to the wire 20 during the crimp stroke. For example, the crimp tooling 136 forms or crimps the terminal 10 around the wire 20 such that the terminal 10 locks onto the wire 20.

The ram 130 is cyclically driven through the crimp stroke from a released state at a top of the crimp stroke to the crimping state at a bottom of the crimp stroke, and then returns to the released state. In the released state, the ram 130 is positioned away from (e.g., above) the base crimper 132 and away from (e.g., above) the terminal feeder 108 and not in contact with any terminal 10. As such, the terminal strip 118 is able to advance the terminals 10 and position a new terminal 10 in the shear zone 114.

The crimp stroke has both an advancing or downward component, shown by the arrow A (FIG. 2), and a return or upward component, shown by the arrow B (FIG. 2). For example, as shown in FIG. 2, the crimp stroke may be divided into a return stroke segment 200, a loading stroke segment 202, a transfer stroke segment 204 and a drive stroke segment 206 (identified from the position of the bottom of the drive component of the ram 130). The return stroke segment 200 of the crimp stroke moves the ram 130 upward from the bottom dead center position to the top position. The loading stroke segment 202 moves the ram 130 downward from the top position to a position where the terminal 10 is loaded in the ram 130, but before the ram 130 moves the terminal 10. For example, the ram 130 may be advanced from the top position to the shear zone 114 during the loading stroke segment. The transfer stroke segment 204 moves the ram 130 downward generally from the position of the feed track 120 to the position of the base crimper 132. For example, the ram 130 may be moved from the shear zone 114 to the crimp zone 112 during the transfer stroke segment 204. The terminal 10 may be sheared from the terminal strip 118 during the transfer stroke segment 204. Alternatively, the terminal may be sheared from the terminal strip 118 during the loading stroke segment 202. The terminal 10 is transferred with the ram 130 as the ram 130 moves along the transfer stroke segment 204. The drive stroke segment 206 moves the ram 130 downward to the bottom dead center position and drives the terminal 10 into the base crimper 132 to form the crimp around the wire 20. In an exemplary embodiment, the transfer stroke segment 204 is longer (e.g., the ram 130 moves further downward) than the drive stroke segment 206.

Figure 3:
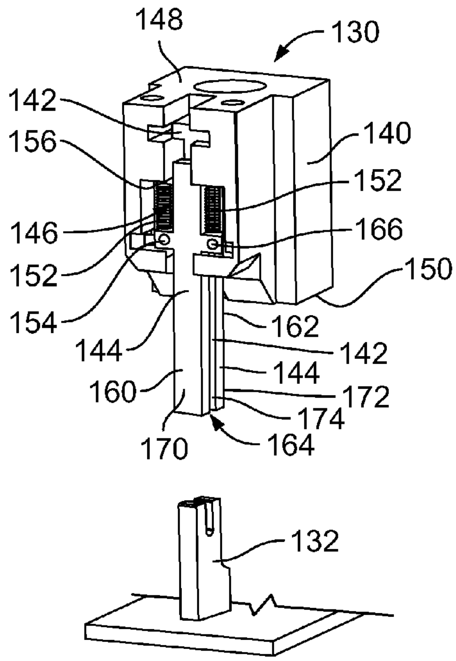
FIG. 3 is a perspective view of a portion of the terminal crimping device showing a ram and base crimper thereof in accordance with an exemplary embodiment.
Figure 4:
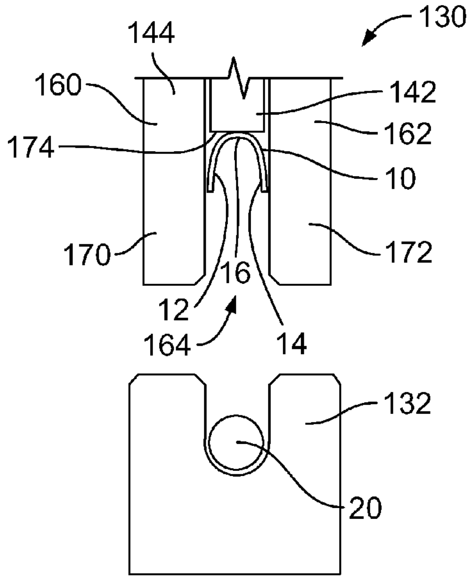
FIG. 4 is a side view of a portion of the terminal crimping device showing a portion of the ram holding a terminal.

FIG. 3 is a perspective view of a portion of the terminal crimping device 102 showing the ram 130 and base crimper 132 in accordance with an exemplary embodiment. FIG. 4 is a side view of a portion of the terminal crimping device 102 showing a portion of the ram 130 holding the terminal 10. FIGS. 3 and 4 illustrate the ram 130 in a loaded position with the terminal 10 loaded into the ram 130. For example, the ram 130 is illustrated at a position between the loading stroke segment and the transverse stroke segment along the crimp stroke.

The ram 130 includes a main body 140 holding a drive crimper 142 and a terminal guide 144. The main body 140 is configured to be coupled to the press 106 (shown in FIG. 1) by a transfer pin or other component therebetween such that the actuator of the press 106 is able to move the ram 130 along the crimp stroke. In the illustrated embodiment, the main body 140 is generally block shaped, however, the main body 140 may have other shapes in alternative embodiments. The main body 140 includes a channel 146 extending therethrough at least partially between a top 148 and a bottom 150 of the main body 140. The terminal guide 144 and drive crimper 142 are received in the channel 146.

Optionally, as described in further detail below, the drive crimper 142 may be fixedly coupled to the main body 140 while the terminal guide 144 may be movably coupled to the main body 140. For example, as the ram 130 is cycled through the crimp stroke, the main body 140 and drive crimper 142 are moved along the full cycle, whereas the terminal guide 144 is moved along a partial cycle. For example, the terminal guide 144 may bottom out on the base crimper 132 and stop downward movement of the terminal guide 144 while the main body 140 and drive crimper 142 continue downward movement to finish crimping the terminal 10 to the wire 20. In an exemplary embodiment, the drive crimper 142 and terminal guide 144 extend beyond and below the bottom 150 of the main body 140.

Optionally, the terminal guide 144 may be spring loaded within the channel 146. For example, springs 152 may be received in the channel 146 between flanges 154 of the terminal guide 144 and shoulders 156 of the channel 146. The springs 152 are compressible as the ram 130 is cycled along the crimp stroke. For example, after the terminal guide 144 bottoms out on the base crimper 132, the spring 152 may be compressed as the main body 140 and drive crimper 142 continue downward movement. The springs 152 bias the terminal guide 144 downward such that, on the return stroke segment of the crimp stroke, as the ram 130 is returned to the top position and the terminal guide 144 is released from the base crimper 132, the springs 152 force the terminal guide 144 to return to a lowered position. In the normal or lowered position, the terminal guide 144 extends beyond and below the drive crimper 142.

In an exemplary embodiment, the terminal guide 144 includes a first terminal guide member 160 and a second terminal guide member 162, which are separated by a gap 164. Optionally, the first and second terminal guide members 160, 162 may be identical. The first and second terminal guide members 160, 162 may be coupled together using fasteners 166, such as between the flanges 154. The drive crimper 142 is received in the gap 164 and is moveable relative to the terminal guide members 160, 162 within the gap 164. In alternative embodiments, rather than having separate terminal guide members, the terminal guide 144 may be a single piece having an opening that receives the drive crimper 142. In other alternative embodiments, rather than having the drive crimper 142 pass through the entire terminal guide 144, the drive crimper 142 may be positioned along a side of the terminal guide 144 with a portion of the drive crimper 142 extending into the gap 164 near a bottom of the terminal guide 144, such portion configured to engage the terminal 10 to effect the crimping of the terminal 10.

In an exemplary embodiment, the terminal guide 144 includes first and second guide fingers 170, 172 at or near the bottom of the terminal guide 144. For example, the first terminal guide member 160 defines the first guide finger 170 and the second terminal guide member 162 defines the second guide finger 172. The guide fingers 170, 172 are separated by the gap 164. The guide fingers 170, 172 may be the lower most ends of the terminal guide members 160, 162. The guide fingers 170, 172 may extend below a bottom 174 of the drive crimper 142 when the terminal guide 144 is in the normal or lowered position. The guide fingers 170, 172 may have chamfered lead-ins to the gap 164.

During the crimping operation, the ram 130 is lowered from the top position (FIG. 1) along the loading stroke segment of the crimp stroke onto the terminal 10. The terminal 10 is received in the gap 164 between the guide fingers 170, 172. The guide fingers 170, 172 may initially pass along the terminal 10 without causing the terminal 10 to move downward with the ram 130. The ram 130 is lowered onto the terminal 10 to the loaded position (FIG. 4) where the bottom 174 of the drive crimper 142 engages the base 16 of the terminal 10. Further lowering of the ram 130 will cause the drive crimper 142 to drive the terminal 10 with the ram 130.

When the terminal 10 is loaded into the gap 164, the legs 12, 14 of the terminal 10 may be at least partially compressed between the guide fingers 170, 172. Such compression may hold the terminal 10 in the gap 164 as the ram 130 transfers the terminal 10 toward the base crimper 132. Such compression of the legs 12, 14 causes an internal spring bias within the terminal 10 to hold the terminal 10 within the ram 130 by an interference fit. From the loaded position, the terminal guide 144 and drive crimper 142 are able to transfer the terminal 10 to the base crimper 132 for crimping to the wire 20. As the ram 130 begins to transfer the terminal 10, the drive crimper 142 shears the terminal 10 from the terminal strip 118 (shown in FIG. 1). For example, the edge at the bottom 174 may shear the terminal 10 from the terminal strip 118. Alternatively, the ram 130 may include a separate shear member used to shear the terminal 10 from the terminal strip 118.

Figure 5:
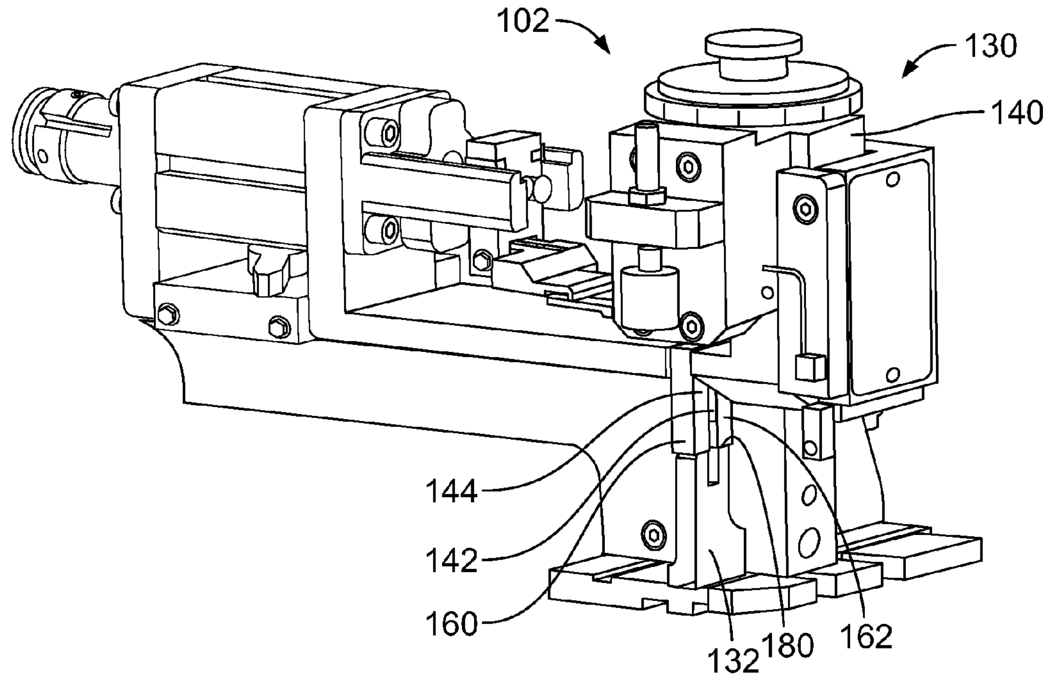
FIG. 5 is a perspective view of a portion of the terminal crimping device during the crimping operation showing the ram at an intermediate position.
Figure 6:
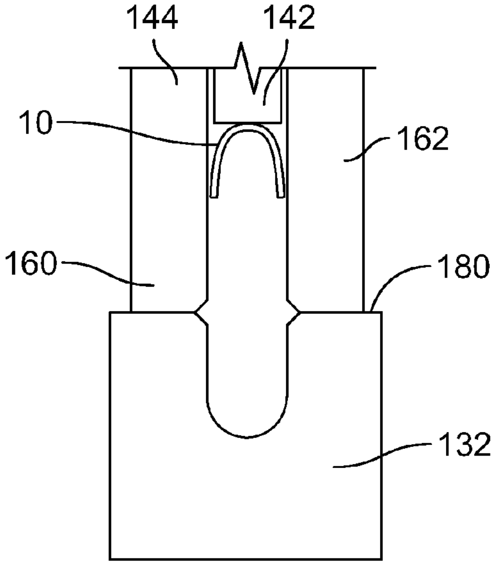
FIG. 6 is a side view of a portion of the terminal crimping device showing the ram at an intermediate position relative to the base crimper.

FIG. 5 is a perspective view of a portion of the terminal crimping device 102 during the crimping operation showing the ram 130 at a position between the transfer stroke segment and the drive stroke segment. FIG. 6 is a side view of a portion of the terminal crimping device 102 showing the ram 130 and the base crimper 132.

During the crimp stroke, the ram 130 is driven downward toward the base crimper 132. The terminal guide 144 and the drive crimper 142 are driven with the main body 140 along the transfer stroke segment to transfer the terminal 10 to the base crimper 132. At the bottom of the transfer stroke segment, the terminal guide 144 bottoms out on a top 180 of the base crimper 132. For example, the terminal guide members 160, 162 both engage the top 180. Downward movement of the terminal guide 144 is blocked by the base crimper 132. However, the drive crimper 142 is able to continue downward movement to drive the terminal 10 into the base crimper 132 to form the crimp. For example, because the drive crimper 142 is movable relative to the terminal guide 144, the drive crimper 142 is not blocked by the base crimper 132, but rather, continues to move downward through the entire downward or advancing component of the crimp stroke.

Figure 7:
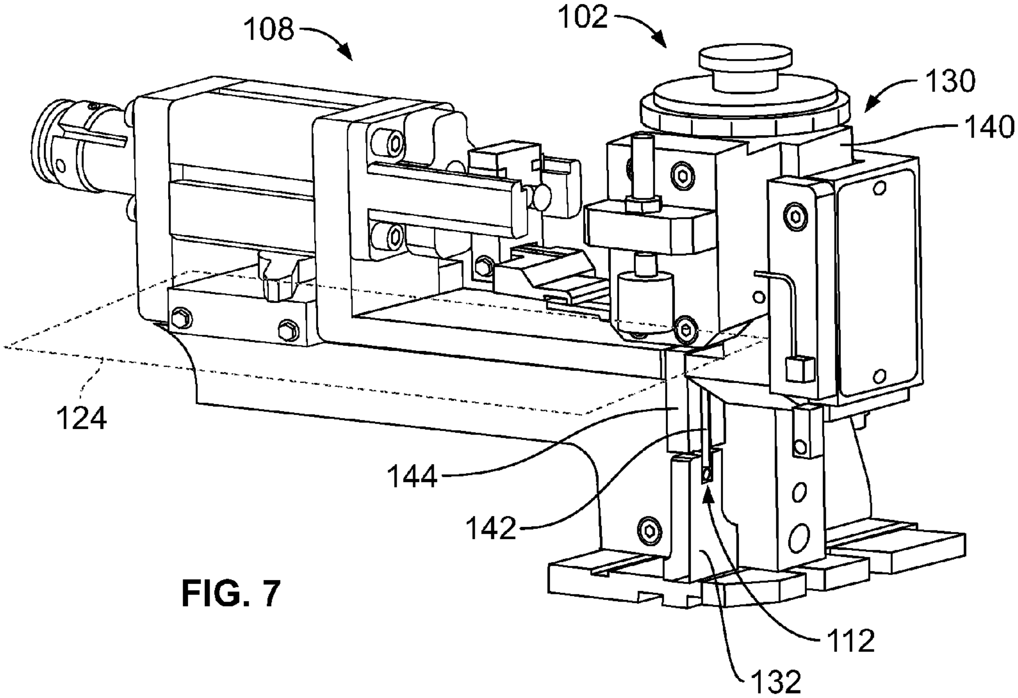
FIG. 7 is a perspective view of a portion of the terminal crimping device during the crimping operation showing the ram at a bottom dead center position.
Figure 8:
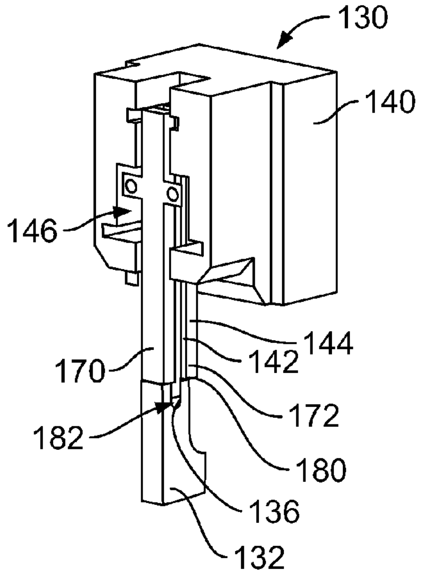
FIG. 8 is a perspective view of a portion of the terminal crimping device showing the ram and base crimper with the ram at the bottom dead center position.
Figure 9:
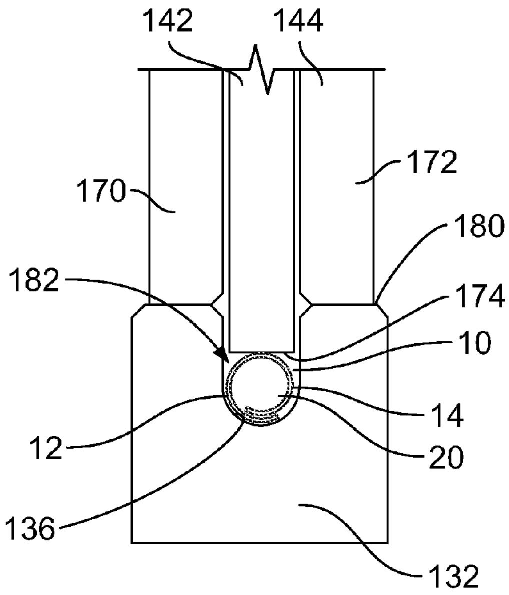
FIG. 9 is a side view of a portion of the terminal crimping device showing the ram and the base crimper with the ram at a bottom dead center position.

FIG. 7 is a perspective view of a portion of the terminal crimping device 102 during the crimping operation showing the ram 130 at a bottom dead center position. FIG. 8 is a perspective view of a portion of the terminal crimping device 102 showing the ram 130 and base crimper 132 with the ram 130 at the bottom dead center position. FIG. 9 is a side view of a portion of the terminal crimping device 102 showing the ram 130 and the base crimper 132 with the ram 130 at a bottom dead center position. The terminal 10 is crimped to the wire 20 by the ram 130 and base crimper 132.

The base crimper 132 includes a top 180 and a terminal channel 182 open at the top 180. The crimp zone 112 is defined within the terminal channel 182. The wire 20 is positioned in the terminal channel 182. The wire 20 may be held in the terminal channel 182 at a position removed from the crimp profile edges to allow the terminal 10 to form around the wire 20. The edges of the base crimper 132 defining the terminal channel 182 form the crimp tooling 136 used to form the terminal 10 as the terminal 10 is driven into the terminal channel 182 by the drive crimper 142. The edges form the legs 12, 14 around the wire 20. The terminal 10 is deformed by the crimp tooling 136 to crimp the terminal 10 to the wire 20. In an exemplary embodiment, a portion of the drive crimper 142 is driven into the terminal channel 182 during the crimping operation to press the terminal 10 into the base crimper 132 such that the crimp tooling 136 may form the crimp between the terminal 10 and the wire 20.

During the crimping operation, the ram 130 is driven downward to transfer the terminal 10 from the terminal strip 118 (shown in FIG. 1) to the crimp zone 112. The terminal guide 144 bottoms out on the top 180 of the base crimper 132. After bottoming out, further downward movement of the ram 130 causes the drive crimper 142 to move downward relative to the terminal guide 144. As the drive crimper 142 is moved downward, the bottom 174 of the drive crimper 142 drives the terminal 10 through the gap 164 and out of the guide fingers 170, 172 into the terminal channel 182. At the bottom dead center position, the terminal 10 is crimped to the wire 20. Optionally, the position of the ram 130 and/or base crimper 132 may be adjustable to adjust the bottom dead center position, such as to accommodate different sized wires 20 and/or terminal 10.

Referring to FIG. 8, once the terminal guide 144 bottoms out on the top 180 of the base crimper 132, the terminal guide 144 is fixed in position while the main body 140 continues to move downward, which causes the drive crimper 142 to correspondingly move downward. As the main body 140 moves downward relative to the terminal guide 144, the springs 152 (shown in FIG. 3) are compressed. For example, the terminal guide 144 passes through the channel 146 as the main body 140 is moved downward. Because the drive crimper 142 is fixed to the main body 140 the drive crimper 142 is forced downward through the gap 164 to drive the terminal 10 out of the terminal guide 144 into the terminal channel 182 of the base crimper 132.

Referring to FIG. 1, a terminal crimping device 102 is provided that allows a pre-formed terminal 10 to be captured, sheared from the terminal strip 118 and transferred to the crimp area 112 remote from the feed plane 124. The terminal crimping device 102 provides clearance space around the crimp area 112, such as clearance from the terminal feeder 108, for positioning the wire 20. For example, workpieces 22 may be held adjacent the crimp zone 112 without interfering with the terminal feeder 108. By shearing and then transporting the single, pre-formed terminal to the crimp zone 112, the remaining terminal strip 118, terminal feeder 108 and other shear tooling can all be located in a different plane than the crimp zone 112, allowing greater access for the workpiece 22.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A terminal crimping device that crimps a terminal to a component held on a base crimper, the terminal crimping device comprising:

a terminal feeder feeding a pre-formed terminal on a horizontal feed plane; and a ram moving a drive crimper along a vertical crimp stroke, wherein, after the terminal is removed from the terminal strip, the drive crimper transferring the terminal from a terminal strip to a crimp zone at the base crimper below the feed plane and remote from the terminal strip, and wherein, at the base crimper, the drive crimper crimps the separated terminal to the component remote from the terminal strip.

2. The terminal crimping device of claim 1, wherein the drive crimper is moved from a top position to a bottom dead center position, the drive crimper shearing the terminal from the terminal strip near the top position, remote from the bottom dead center position.

3. The terminal crimping device of claim 1, wherein the ram is moved upward along a return stroke segment of the crimp stroke to a top position, the ram being moved downward from the top position along a loading stroke segment, a transfer stroke segment and a drive stroke segment to a bottom dead center position, the transfer stroke segment being longer than the drive stroke segment.

4. The terminal crimping device of claim 3, wherein the drive crimper moves the terminal from the feed plane to the base crimper at the crimp zone during the transfer stroke segment, and wherein the drive crimper deforms the terminal and crimps the terminal to the component during the drive stroke segment.

5. The terminal crimping device of claim 1, wherein the pre-formed terminal is generally arch shaped having legs meeting at a top, the drive crimper engaging the top and driving the legs into crimp tooling to deform the legs into a general barrel shape around the component and crimp the terminal to the component.

6. The terminal crimping device of claim 1, wherein the terminal feeder has a feed track holding the pre-formed terminals along the horizontal feed plane and feeding the terminals along a feed axis on the horizontal feed plane.

7. The terminal crimping device of claim 1, further comprising a base crimper held in a fixed crimping position relative at the crimp zone remote from the feed plane, the base crimper having crimp tooling configured to crimp the terminal to the component, the ram moving the drive crimper along a crimp stroke towards and away from the base crimper.

8. The terminal crimping device of claim 7, wherein the base crimper includes a top and a terminal channel open at the top and defining the crimp tooling, the ram engaging the top during the crimp stroke, the drive crimper driving the terminal into the terminal channel to deform the terminal using the crimp tooling.

9. The terminal crimping device of claim 1, wherein the drive crimper engages the pre-formed terminal and shears the terminal from the terminal strip as the drive crimper transfers the terminal out of the feed plane to the crimp zone.

10. The terminal crimping device of claim 1, wherein the drive crimper shears the pre-formed terminal from the terminal strip and transfers the terminal to the crimp zone prior to deforming the terminal and crimping the terminal to the component.

11. The terminal crimping device of claim 1, further comprising a shear zone along the horizontal feed plane positioned directly vertically above the crimp zone, the terminal feeder feeding the terminal to the shear zone, the drive crimper engaging the terminal in the shear zone and shearing the terminal from the terminal strip in the shear zone prior to transferring the sheared terminal from the shear zone to the crimp zone, the drive crimper cooperating with crimp tooling of the base crimper to deform the terminal and crimp the terminal to the component in the crimp zone.

12. A terminal crimping device that crimps a terminal to a component, the terminal crimping device comprising:

a terminal feeder feeding a pre-formed terminal on a horizontal feed plane; and a ram moving a drive crimper along a vertical crimp stroke, the drive crimper transferring the terminal to a crimp zone below the feed plane and remote from the terminal strip to crimp the terminal to the component, wherein the ram includes a terminal guide having guide fingers separated by a gap, the gap receiving the terminal and holding the terminal as the ram transfers the terminal from the terminal strip to the crimp zone.

13. The terminal crimping device of claim 12, wherein the drive crimper is moveable relative to the terminal guide.

14. The terminal crimping device of claim 12, wherein the drive crimper is received in the gap and is configured to move the terminal relative to the guide fingers.

15. The terminal crimping device of claim 12, further comprising a base crimper positioned below the ram at the crimp zone, the terminal being crimped to the component by the base crimper and the drive crimper, wherein the terminal guide bottoms out on the base crimper as the ram is moved along the crimp stroke, the drive crimper causing the terminal to move into the base crimper after the terminal guide bottoms out.

16. The terminal crimping device of claim 12, wherein the drive crimper is moved from a top position to a bottom dead center position, the drive crimper shearing the terminal from the terminal strip near the top position, remote from the bottom dead center position.

17. The terminal crimping device of claim 12, wherein the ram is moved upward along a return stroke segment of the crimp stroke to a top position, the ram being moved downward from the top position along a loading stroke segment, a transfer stroke segment and a drive stroke segment to a bottom dead center position, the transfer stroke segment being longer than the drive stroke segment.

18. The terminal crimping device of claim 12, further comprising a base crimper held in a fixed crimping position relative at the crimp zone remote from the feed plane, the base crimper having crimp tooling configured to crimp the terminal to the component, the ram moving the drive crimper along a crimp stroke towards and away from the base crimper.

19. The terminal crimping device of claim 12, wherein the drive crimper shears the pre-formed terminal from the terminal strip and transfers the terminal to the crimp zone prior to deforming the terminal and crimping the terminal to the component.

20. The terminal crimping device of claim 12, further comprising a shear zone along the horizontal feed plane positioned directly vertically above the crimp zone, the terminal feeder feeding the terminal to the shear zone, the drive crimper engaging the terminal in the shear zone and shearing the terminal from the terminal strip in the shear zone prior to transferring the sheared terminal from the shear zone to the crimp zone, the drive crimper cooperating with crimp tooling of the base crimper to deform the terminal and crimp the terminal to the component in the crimp zone.

* * * * *